No. 872,286. PATENTED NOV. 26, 1907.
J. C. JEWETT & J. L. BOWEN.
MILK COOLING APPARATUS.
APPLICATION FILED AUG. 10, 1904.
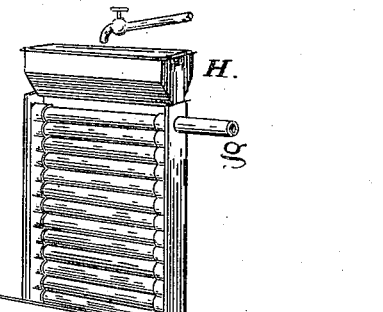
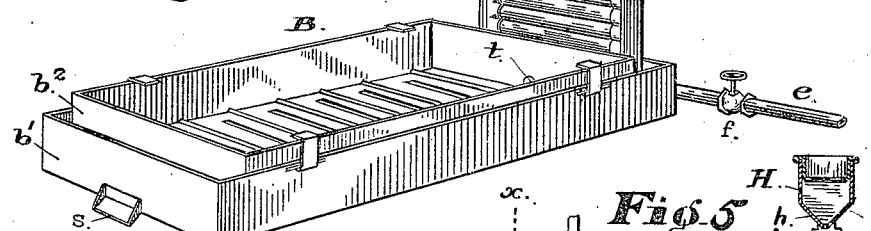
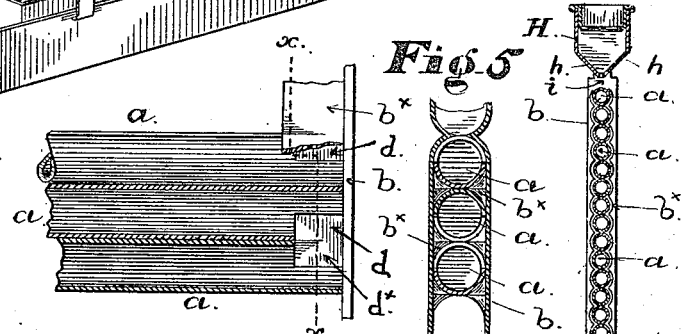
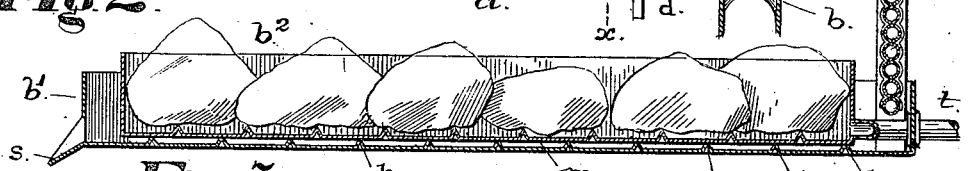
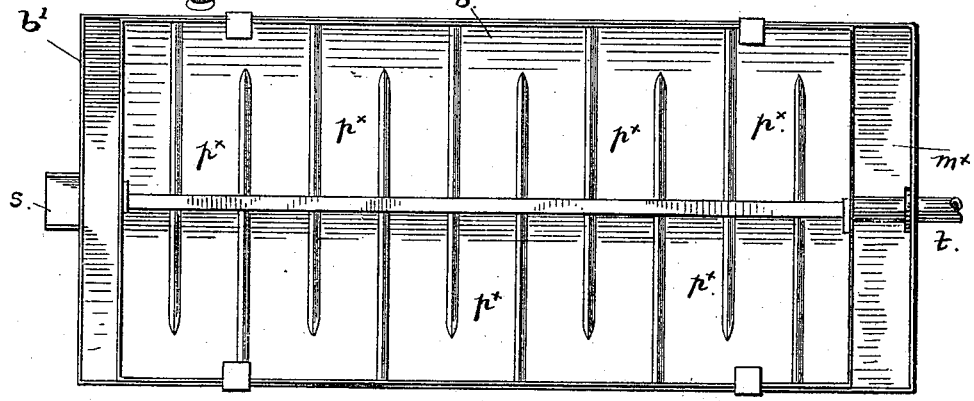
Witnesses.
Arthur L. Slee
M. Regner
Inventors
John C. Jewett
John L. Bowen

UNITED STATES PATENT OFFICE.

JOHN C. JEWETT AND JOHN L. BOWEN, OF SAN FRANCISCO, CALIFORNIA.

MILK-COOLING APPARATUS.

No. 872,286.     Specification of Letters Patent.     Patented Nov. 26, 1907.

Application filed August 10, 1904. Serial No. 220,168.

*To all whom it may concern:*

Be it known that we, JOHN C. JEWETT and JOHN L. BOWEN, citizens of the United States, residing at San Francisco, in the county of San Francisco and State of California, have invented new and useful Improvements in Milk-Cooling Apparatus, of which the following is a specification.

Our invention is designed to carry on the process of cooling milk to required low temperatures on a large scale and at a minimum cost in ice, and in time and labor involved, in the operation of bringing new milk in condition for transporting it from dairy to market; and to this end it is constructed with a view to reduce the consumption of ice to the smallest possible quantity for treating a given quantity of milk, and for applying such refrigerant in the most effective manner to act on the milk.

The apparatus comprises a preliminary cooling means in which the cooling action of flowing water at normal temperatures such as is obtainable from the service-pipe, or from any other source at hand, is used to bring down the temperature of the milk at the beginning of the operation when it is first introduced into the apparatus; and, in connection with such cooling means, a refrigerating means is arranged to receive the cooled milk and reduce it to its final cold state through the medium of the body of ice contained in such refrigerator. These two parts are so arranged and combined that the cooling mediums, that is to say, the water at normal temperature and the water from the melting ice, always flow or circulate in opposite directions, or contrary to the milk being treated; with the effect to bring the flowing milk progressively in contact with cooling walls or surfaces of gradually decreasing temperature, so that the cooling effect of the water will be the greatest at the point where the milk passes into the refrigerating part of the apparatus. The last-mentioned part has a pan or open receptacle containing the ice, and a circuitous passage beneath the bottom of the pan into which the milk after being subjected to the cooling action of the flowing water is directly carried and caused to flow, and from which it is finally discharged into the cans.

Figure 1 is an elevation in perspective of a milk cooling apparatus constructed according to my invention. Fig. 2 is a longitudinal section through the center on an enlarged scale. Fig. 3 is a plan of the pan cooler. Fig. 4 is a detail of the tubular cooler, showing the manner of connecting the tubes at the ends to form a continuous passage for the water. Fig. 5 is a cross section on the line $x$—$x$ of Fig. 4.

The cooler A is composed of a number of tubes —$a$— set horizontally in close contact, and joined at the ends by upright coupling-frames or boxes —$b$— that connect the tubes together at the ends alternately at opposite sides, so as to form a continuous conducting passage extending from top to bottom and from side to side. A supply-pipe —$e$— provided with a stop-cock —$f$— is coupled to the end of this lowermost tube, and a discharge-pipe —$g$— from the top tube carries away the water from that outlet. Above the top-tube, a stationary milk-trough —H— having inclined sides forming a double inclined bottom —$h$— is fixed in place between the sides —$b$, so that the channel formed by the converging sides lies directly over and in line with the top tube. Perforations —$i$— in the bottom of the channels are arranged at short intervals apart to discharge the milk in fine streams directly in line with and over the longitudinal center-line of the tube, so as to deliver the milk equally, or nearly so, over both sides of the cooling-surface of the tubes.

The base of the apparatus is formed or composed of a pan —B— with standing-sides, and a double bottom, the upper part or member —$b^2$— of which forms the bottom of an ice-holder, and the lower part or member —$b^1$— the conducting-surface for the milk. This lower bottom —$b^1$— extends beyond the upper bottom —$b^2$— and directly under the lower end of the cooler —A, the space —$m^\times$— being inclosed by standing sides and ends, as shown, so as to form a catch-basin or receptacle for the milk flowing from the front and rear surfaces of the cooler —A. A similar space at the opposite end of the pan —B— is provided with a discharge-spout —$s$— in the standing-end, through which the refrigerated milk flows into the can. These receiving and discharging spaces or compartments at opposite ends and the connecting space between the two bottoms —$b^1$—$b^2$— constitute the passage or compartment in which the final refrigerating operation is carried on; the passage being so arranged that the milk comes in contact with the under-surface of the bottom —$b^2$— which carries the ice on its upper surface. A continuous flow of the milk through this passage is secured by giving the bottom —$b^1$— a pitch or inclination toward the discharge-spout —$s$, but the flow is retarded, and the milk caused to take a zig-zag or circuitous route by, placing riffles —$p$— transversely of the passage. The riffles fixed or formed on the bottom —$b^1$— extend from opposite sides and terminate a short distance from the side opposite to that from which they spring, so that the breaks or openings connect the transverse channels between the riffles in a continuous but circuitous passage, the height of which is governed by the height of the riffles that are formed or fixed on the upper bottom —$b^2$—, or the lower bottom —$b^1$. An outlet —$t$— for the water from the melting ice is provided at one end of the ice-holding pan; the continuous or proper flow and discharge of this water being secured by giving the bottom —$b^2$— a slight pitch toward the outlet.

As thus constructed it will be seen that our improved apparatus provides for utilizing or employing flowing water at ordinary temperature for bringing down the temperature of new milk and then effecting the final refrigeration by bringing the cooled milk in contact with one side of a refrigerating surface having a body of ice against the opposite side, the course and flow of the milk being continuous and in the same general direction. A low temperature and a uniform reduction of temperature is by this means obtained, with great economy in the consumption of ice, and also with a saving in time and labor involved in cooling milk for shipment on a large scale.

Figs. 4 and 5 illustrate a simple way of forming the plate-cooler from a number of tubes $a$ of uniform length. The tubes $a$ are placed one above the other, with their sides in close contact, and are united by standing side-pieces formed of flat plates —$b$— against which the ends of the tubes are fixed by soldering. Communication between each tube and the next one above and also below is made by cutting rectangular openings $d$ at opposite ends and in such alternate manner that the opening $d$ at one end of a tube is in line and will register with the corresponding opening in the next tube beneath; while the opening $d$ at the opposite end will register with the next tube above; thereby forming a continuous passage through the whole number of tubes from top to bottom. The cut-away portions of the tubes are covered by strips —$b^1$—, which are bent to fit closely to the tubes and form the side-walls of the openings; the strips being soldered to the side-pieces and to the tubes to make water-tight joints. Any crevices existing between the sides of the tubes that lie in contact may be closed by solder.

What we claim as our invention and desire to secure by Letters Patent is:—

In a cooling apparatus for milk, the combination of an upright cooling plate over which the milk is adapted to flow by gravity, consisting of a series of tubes connected together to form a continuous passage for a circulating medium, a trough for delivering milk to said cooling plate, a pan into which the milk from said cooling plate is delivered, means for causing the milk to take a circuitous passage from the receiving end to the discharge end thereof, an ice pan of a size transversely to fit tightly within the milk pan and form a conducting passage for the milk between its bottom surface and the upper surface of the milk pan, and of a length less than that of the milk pan and arranged to form a catch basin at the receiving end of the milk pan into which the lower end of the cooling plate is set, and a discharge spout for the milk at the other end of the milk pan.

In testimony whereof we have hereunto set our names to this specification in the presence of two subscribing witnesses.

JOHN C. JEWETT.
JOHN L. BOWEN.

Witnesses:
EDWARD E. OSBORN,
M. REGNER.